United States Patent
Loo et al.

(10) Patent No.: US 8,900,744 B2
(45) Date of Patent: Dec. 2, 2014

(54) AUTOMOTIVE BATTERY CASE

(75) Inventors: Weng Leong Loo, Chiryu (JP); Yutaka Fujiwara, Okazaki (JP); Hideki Yoshioka, Anjo (JP); Yasuhiro Inoue, Anjo (JP); Fumihiro Ogata, Okazaki (JP); Seiichi Takasaki, Okazaki (JP); Hideki Honjo, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 333 days.

(21) Appl. No.: 13/393,081

(22) PCT Filed: Nov. 24, 2010

(86) PCT No.: PCT/JP2010/070863
§ 371 (c)(1),
(2), (4) Date: Feb. 28, 2012

(87) PCT Pub. No.: WO2011/086771
PCT Pub. Date: Jul. 21, 2011

(65) Prior Publication Data
US 2012/0164500 A1 Jun. 28, 2012

(30) Foreign Application Priority Data

Jan. 15, 2010 (JP) .................................. 2010-006970
Jan. 15, 2010 (JP) .................................. 2010-006971

(51) Int. Cl.
*H01M 2/08* (2006.01)
*H01M 2/10* (2006.01)
*H01M 2/12* (2006.01)
*B60K 1/04* (2006.01)

(52) U.S. Cl.
CPC .......... *H01M 2/1072* (2013.01); *H01M 2/1083* (2013.01); *H01M 2/1229* (2013.01); *B60K 1/04* (2013.01)
USPC .............................. 429/172; 429/82; 429/185

(58) Field of Classification Search
CPC ....................................................... H01M 2/1083
USPC .................... 429/172, 167, 185, 82; 180/68.5
See application file for complete search history.

(56) References Cited

U.S. PATENT DOCUMENTS 7,997,368 B2 8/2011 Takasaki et al.

FOREIGN PATENT DOCUMENTS

| CN | 101548412 A | 9/2009 |
|---|---|---|
| EP | 1 950 070 A1 | 7/2008 |
| EP | 2207224 A1 | 7/2010 |
| JP | 2538716 Y2 | 6/1997 |
| JP | 2000-85375 A | 3/2000 |
| JP | 2003-146087 A | 5/2003 |
| JP | 2009-87645 A | 4/2009 |

OTHER PUBLICATIONS

European Search Report mailed Aug. 5, 2013 for corresponding EP Application No. 10 84 3126.

*Primary Examiner* — Jonathan Jelsma
(74) *Attorney, Agent, or Firm* — Birch, Stewart, Kolasch & Birch, LLP

(57) ABSTRACT

A battery case comprises a tray member (20), a cover member (22), a first holding member (24) of a metal arranged to contact a tray flange (32) with its outer circumferential edge portion projecting outward from the tray flange by a predetermined length, a second holding member (26) of a metal arranged to contact a cover flange (36) with its outer circumferential edge portion projecting outward from the cover flange by a predetermined length, and a fastening means (28, 29) fastening the first and second holding members together at a predetermined location outwardly away from the tray and cover flanges.

12 Claims, 14 Drawing Sheets

AUTOMOTIVE BATTERY CASE

TECHNICAL FIELD

This invention relates to an automotive battery case, specifically a battery case for holding a battery for powering an electric motor for driving a vehicle.

BACKGROUND ART

In recent years, development of hybrid and electric vehicles equipped with a large-capacity battery to supply electric power to a drive motor mounted as a vehicle drive power source has been prevailing.

An example of battery case mounted on such motor-driven vehicle comprises a tray member holding a battery module including a lithium ion battery, and a cover member covering the tray member. The battery case of this type requires joining the tray member and the cover member together.

For example, patent document 1 discloses a structure for joining the tray member and the cover member together, in which the tray member and the cover member each have a joint portion, the joint portion of the tray member having bolts and nuts embedded therein, so that the tray member and the cover member are fastened together by tightening nuts onto the embedded bolts and tightening bolts into the embedded nuts, from above the joint portion of the cover member.

PRIOR ART DOCUMENT

Patent Document

Patent document 1: Japanese Patent Application Laid-open No. 2009-87645 Publication

SUMMARY OF THE INVENTION

Problem to be Solved by the Invention

In the technique disclosed in patent document 1, however, the tray member and the cover member are made of resin. This entails a drawback that the resin undergoes deformation in the intervals between the bolts fastening the tray member and the cover member together, under the influence of low or high temperatures, such deformation leading to a decrease in sealing performance and waterproof performance.

To reduce the deformation, it is conceivable to arrange bolts at shorter intervals. This however results in an increase in the number of bolts to be tightened, and thus, an increase in man-hours, which is unfavorable.

Further, in inserting and tightening bolts into the embedded nuts, if the torque applied to tighten the bolt is greater than a specific value, it causes the mating embedded nut to spin around, and if it is smaller than a specific value, the bolt tightened easily becomes loose. There is therefore a need to manage the torque applied to tighten the bolt between the upper and lower limits, which is unfavorable.

Further, there is a need to ensure sufficient sealing performance even when the tray member and the cover member deform. In the prior technique disclosed in patent document 1, however, a sealing member is arranged between the peripheral portions of the tray and cover members provided as joint portions, and variation in some dimension of the cover or tray member, for example changes the thickness of the peripheral portion thereof, or deformation of the cover or tray member under the influence of low or high temperatures, for example thermal creep thereof, does not allow substantially-uniform pressure to be exerted on the contact surfaces, leading to a decrease in sealing performance and waterproof performance, and thus a decrease in reliability.

The present invention has been made to solve the above problems. An object of the present invention is to provide an automotive battery case including a tray member and a cover member made of resin and joined together by bolts and nuts, which can reduce deformation of the resin in the intervals between the bolts, allows the torque to be applied stably to tighten the bolts, ensures that sufficient pressure is exerted on the contact surfaces even when the resin undergoes deformation, and thus, stably provides required sealing performance.

Means for Solving the Problem

In order to achieve this object, the first aspect of the invention is an automotive battery case for holding a battery for driving a vehicle, comprising: a tray member of a resin, including a holder portion for holding the battery and a tray flange projecting outward from the holder portion; a cover member of a resin, including a cover portion designed to cover the battery and a cover flange projecting outward from the cover portion, the tray member and the cover member being arranged with the tray flange and the cover flange placed one on the other; a first holding member of a metal arranged to contact the tray flange with an outer circumferential edge portion projecting outward from the tray flange by a predetermined length; a second holding member of a metal arranged to contact the cover flange with an outer circumferential edge portion projecting outward from the cover flange by a predetermined length, and a fastening means fastening the first and second holding members together at a predetermined location outwardly away from the tray and cover flanges.

The second aspect of the invention is an automotive battery case of the type of the first aspect, wherein at least either one of the first and the second holding member includes a bent portion contacting the corresponding tray or cover flange and then extending in a direction away from the tray or cover flange.

The third aspect of the invention is an automotive battery case of the type of the first or second aspect, further comprising one or more projections arranged on at least either one of the tray flange and the cover flange, said one or more projections being covered by the bent portion.

The fourth aspect of the invention is an automotive battery case of any of the first to third aspects, further comprising ribs arranged on the tray flange along its circumference at predetermined intervals, the ribs each extending to connect the tray flange and the holder portion.

The fifth aspect of the invention is an automotive battery case of the type of any of the first to fourth aspects, further comprising a seal member for sealing a joint at which the tray flange and the cover flange meet, said seal member being arranged at the joint at which the tray flange and the cover flange held between the first and the second holding members meet.

The sixth aspect of the invention recited in claim 6 is an automotive battery case of the type of any of the first to fourth aspects, further comprising a groove provided in either one of the tray flange and the cover flange to extend continuously along its circumference, a projecting portion provided on the other of the tray flange and the cover flange to extend continuously along its circumference and fitted in said groove, and an elastic member arranged between the projecting portion and the groove, wherein at least either the projecting portion or the elastic member has a vertical cross-section gradually widening in the direction from a top toward a bottom of the projecting portion to make a surface of the elastic member which faces the groove contact an inner surface of the groove, where "vertical" means the direction at right angles to the direction in which the projecting portion continuously extends.

The seventh aspect of the invention is an automotive battery case of the type of the sixth aspect, wherein the elastic member has a vertical cross-section approximately in the shape of a V or an inverted V designed to allow the elastic member to be fitted over the projecting portion, where "vertical" means the direction at right angles to the direction in which the projecting portion continuously extends.

The eight aspect of the invention is an automotive battery case of the type of the sixth or seventh aspect, wherein the elastic member is an elastic rubber member.

The ninth aspect of the invention is an automotive battery case of the type of the sixth or seventh aspect, wherein the groove has horizontal cross-sectional area increasing from a bottom toward an open end, where "horizontal" means the direction in which the projecting portion fitted in the groove continuously extends.

The tenth aspect of the invention recited in claim 10 is an automotive battery case of the type of any of the sixth to ninth aspects, wherein the groove has an air vent extending through the bottom of the groove, and a sealing plug fitted in to close the air vent after the elastic member is arranged in the groove.

The eleventh aspect of the invention is an automotive battery case of the type of any of the sixth to tenth aspects, wherein at least either one of the elastic member and an inner surface of the groove has one or more projections so that the elastic member and the inner surface of the groove contact each other at said one or more projections.

The Twelfth aspect of the invention is an automotive battery case of the type of any of the sixth to eleventh aspects, further comprising a restricting portion preventing the groove from widening due to the projecting portion fitted in the groove.

Effect of the Invention

In the automotive battery case according to the first aspect, the first holding member of a metal arranged to contact the tray flange with its outer circumferential edge portion projecting outward from the tray flange by a predetermined length and the second holding member of a metal arranged to contact the cover flange with its outer circumferential edge portion projecting outward from the cover flange by a predetermined length are fastened together by fastening means at predetermined locations outwardly away from the tray and cover flanges.

The first and second holding members, each made of a metal, are arranged on the tray member and the cover member, respectively, and fastened together with the tray flange and the cover flange held therebetween. This prevents the resin from deforming under the influence of low or high temperatures, leading to improved sealing performance of the battery case.

The first and second holding members, each made of a metal, are fastened together by fastening means at predetermined locations outwardly away from the tray and cover flanges. This means that the fastening means do not fasten the cover or tray member, each made of a resin, together with the first and second holding members. Accordingly, the first and second holding members fastened together exhibit high rigidity, which allows the fastening means to be arranged at increased intervals to fasten the first and second holding members together, leading to a reduction in costs and an increase in productivity.

The fastening means for fastening the first and second holding members do not include embedded nuts, and thus, can be tightened by stably applying torque. This widens the allowable range of torque applied to tighten the fastening means and facilitates the torque management, leading to an increase in productivity.

In the automotive battery case of the second aspect recited in claim 2, at least either the first or the second holding member includes a bent portion contacting the corresponding tray or cover flange and then extending in a direction away from the tray or cover flange. Such bent portion elastically deforms to push on the corresponding flange, leading to improved sealing performance of the battery case.

In the automotive battery case of the third aspect recited in claim 3, one or more projections are arranged on at least either the tray flange or the cover flange, said one or more projections being covered by the bent portion. Thus, even if a force tending to pull the first or second holding member away from the tray and cover flanges is applied, the first and second holding members are prevented from coming off the flanges by the bent portion colliding against said one or more projections. Said one or more projections thus function to resist such force, leading to improved sealing performance of the battery case.

In the automotive battery case of the fourth aspect recited in claim 4, ribs are arranged on the tray flange along its circumference at predetermined intervals, the ribs each extending to connect the tray flange and the holder portion. Such ribs increase the rigidity of the tray member, and thus, increase the strength of the battery case as a whole.

In the automotive battery case of the fifth aspect, a seal member is arranged at the joint at which the tray flange and the cover flange held between the first and second holding members meet. The forces pushing on the tray and cover flanges exerted by the first and second holding members fastened together are thus effectively transmitted to the seal member. The seal member therefore effectively seals the contact surfaces, leading to improved sealing performance of the battery case.

In the automotive battery case of the sixth aspect, the cover flange and the tray flange are held one on the other by the holding members fastened together by the fastening means, one of the two flanges has a groove extending continuously along its circumference, the other has a projecting portion extending continuously along its circumference, and a continuous elastic member is arranged between the projecting portion and the groove, wherein at least either the projecting portion or the elastic member has a vertical cross-section gradually widening in the direction from the top toward the bottom of the projecting portion to make the groove-facing surface of the elastic member contact the inner surface of the groove, where "vertical" means the direction at right angles to the direction in which the projecting portion continuously extends.

The cover flange and the tray flange, held one on the other by the holding members fastened together by the fastening means, are pushed on toward each other, as a result of the fastening means exerting forces in their axial direction. Since at least either the projecting portion or the elastic member has a vertical cross-section gradually widening in the direction from the top toward the bottom of the projecting portion, where "vertical" means the direction at right angles to the direction in which the projecting portion continuously extends, the elastic member is pressed into the groove with its surface in contact with the inner surface of the groove, resulting in an increased area of contact. This means that the elastic member receives from the inner surface of the groove a compressing force vertically acting on an increased area of contact, and thus, receives an increased compressing force.

Even when the force exerted by the fastening means varies from fastening means to fastening means, the elastic member is pressed into the groove as a result of the cover flange and the tray flange being pushing on toward each other. Consequently, the elastic member receives from the inner surface of the groove a compressing force vertically acting on the contacting surface. The compressing force vertically acting on the contacting surface does not significantly vary from place to place, leading to stable sealing performance and increased reliability.

Even if there is variation in some dimension of the cover or tray member constituting the battery case, the elastic member, which is pressed into the groove as a result of the fastening means exerting forces in their axial direction, maintains sealing performance and provides improved waterproof performance of the battery case.

Further, even if deformation under the influence of low or high temperatures or others produces variation in some dimension of the cover or tray member, the elastic member maintains sealing performance.

In the automotive battery case of the seventh aspect, the elastic member has a vertical cross-section approximately in the shape of a V or an inverted V designed to allow the elastic member to be fitted over the projecting portion, where "vertical" means the direction at right angles to the direction in which the projecting portion continuously extends. Such elastic member provides increased ease of fitting over the projecting portion, leading to an increase in productivity.

In the automotive battery case of the eight aspect, the elastic member is an elastic rubber member, which seals the boundary with the groove satisfactorily, leading to improved sealing performance, and thus, improved waterproof performance.

In the automotive battery case of the ninth aspect, the groove has horizontal cross-sectional area increasing from a bottom toward an open end, where "horizontal" means the direction in which the projecting portion fitted in the groove continuously extends. Such groove contacts the elastic member with an increased area of contact, and thus, the inner surface of the groove applies an increased compressing force on the elastic member, leading to improved sealing performance, and thus, improved waterproof performance.

In the automotive battery case of the tenth aspect, the groove has an air vent extending through the bottom of the groove. Although fitting the elastic member in the groove causes an increase in pressure exerted on bottom of the groove, the pressure decreases by the air vent allowing air to flow out. This helps the sealing member be uniformly fitted in the groove.

After the projecting portion with the elastic member fitted on is fitted in the groove, the sealing plug is fitted in the air vent to close the air vent. With the air vent closed with the sealing plug, the bottom of the groove forms a continuous extension. Thus, the space between the groove-facing surface of the elastic member and the inner surface of the groove is hermetically closed and the elastic member maintains sealing performance.

In the automotive battery case of the eleventh aspect, either the elastic member or the inner surface of the groove has one or more projections. This allows the elastic member and the groove to contact each other at an increased number of surfaces and with an increased area of contact, and thus, the elastic member receives from the inner surface of the groove an increased compressing force, leading to improved sealing performance, and thus, improved waterproof performance.

The automotive battery case of the twelfth aspect comprises a restricting portion preventing the groove from widening due to the projecting portion fitted in the groove. The restricting portion thus prevents decrease in sealing performance caused by decrease in compressing force due to widening of the groove. The restriction of the groove's widening results in the projection portion with the elastic member being securely fitted in the groove and effectively producing the wedge effect. The elastic member thus undergoes sufficient compressing force, leading to improved sealing performance and thus, improved waterproof performance.

BRIEF DESCRIPTION OF THE DRAWINGS

FIG. 1 is a perspective view of an electric vehicle with a battery case according to the present invention mounted on;

MODE FOR CARRYING OUT THE INVENTION

First Embodiment

Figure 1:
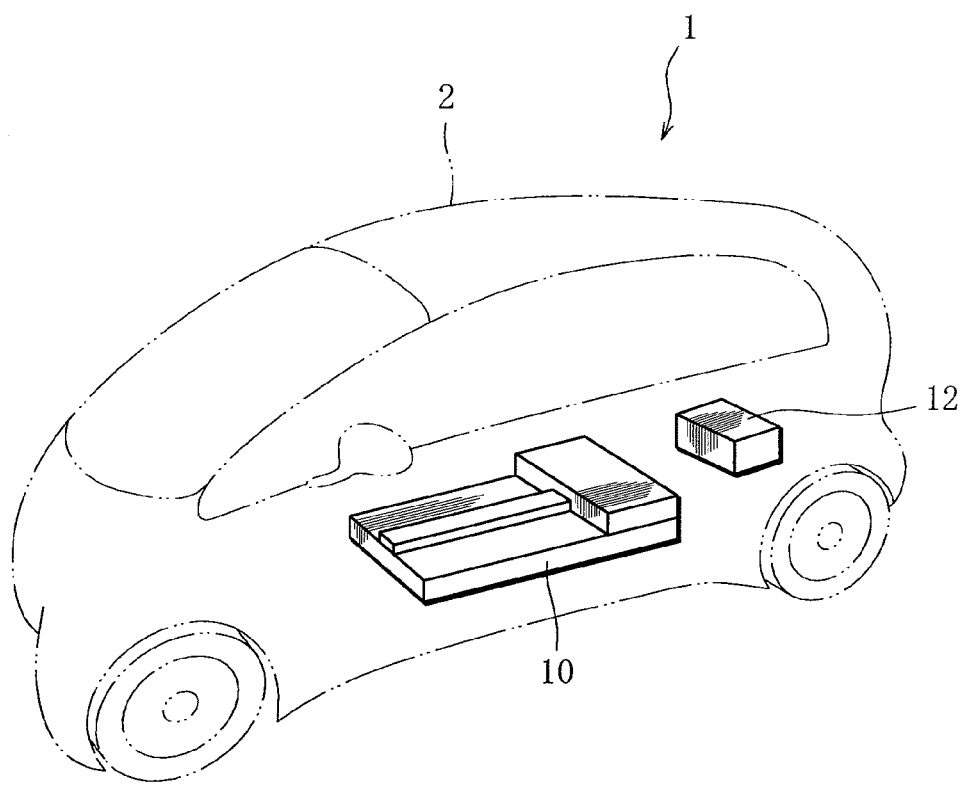

Referring to the drawings attached, a first embodiment of the present invention will be described below. The first embodiment is intended to reduce deformation of peripheral portions, or flanges of a resin tray and a cover constituting a battery case, as will be explained below in detail.

FIG. 1 is a perspective view of an electric vehicle with a battery case according to the present invention mounted on.

As shown in FIG. 1, the electric vehicle 1 has a battery case 10 arranged under the floor of a vehicle body 2, an electrical path for external charging, not shown, and a charger 12 arranged on the rear side of the vehicle body 2 to be supplied with electric power via the electrical path for external charging. The charger 12 is connected to the battery case 10 to charge the battery.

Figure 2:
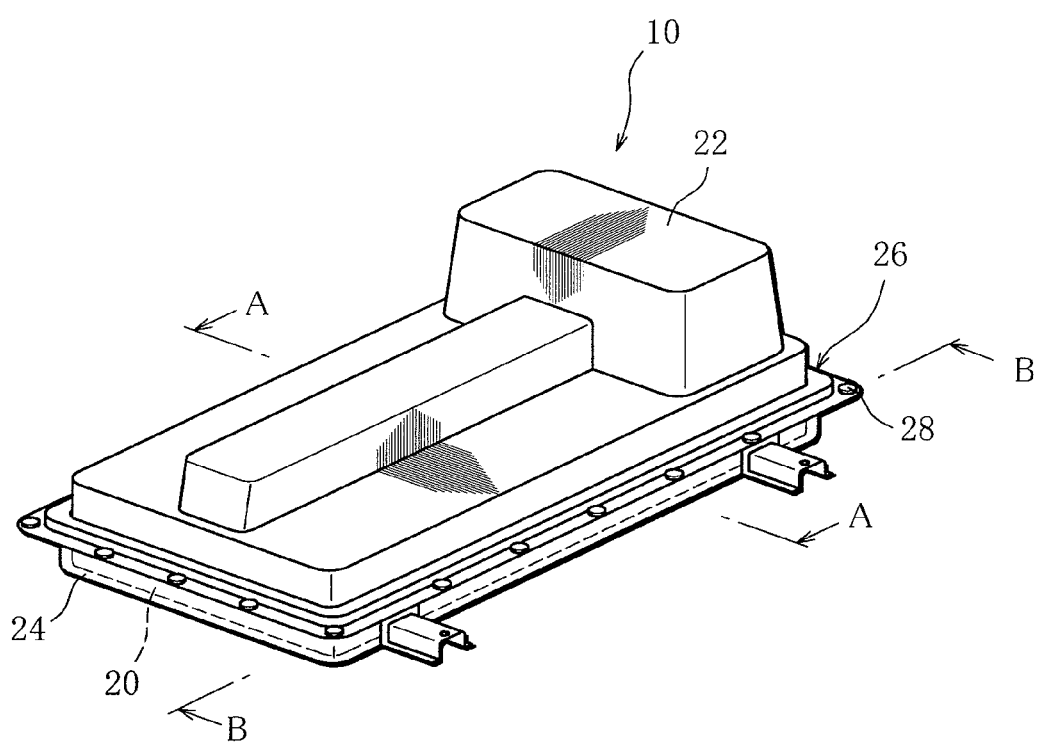
FIG. 2 is a diagram schematically showing the structure of the battery case shown in FIG. 1.

As shown in FIG. 2, the battery case 10 comprises a resin tray (tray member) 20, a cover (cover member) 22, a first metal plate (first holding member) 24 arranged to cover the periphery of the resin tray 20 including a flange, a second metal plate (second holding member) 26 arranged to cover a flange of the cover 22, and bolts (fastening means) 28 and nuts 29 (fastening means) fastening the first and second metal plates 24, 26 together. The nuts 29 may be weld nuts welded to the first or the second metal plate 24 or 26.

Figure 3:
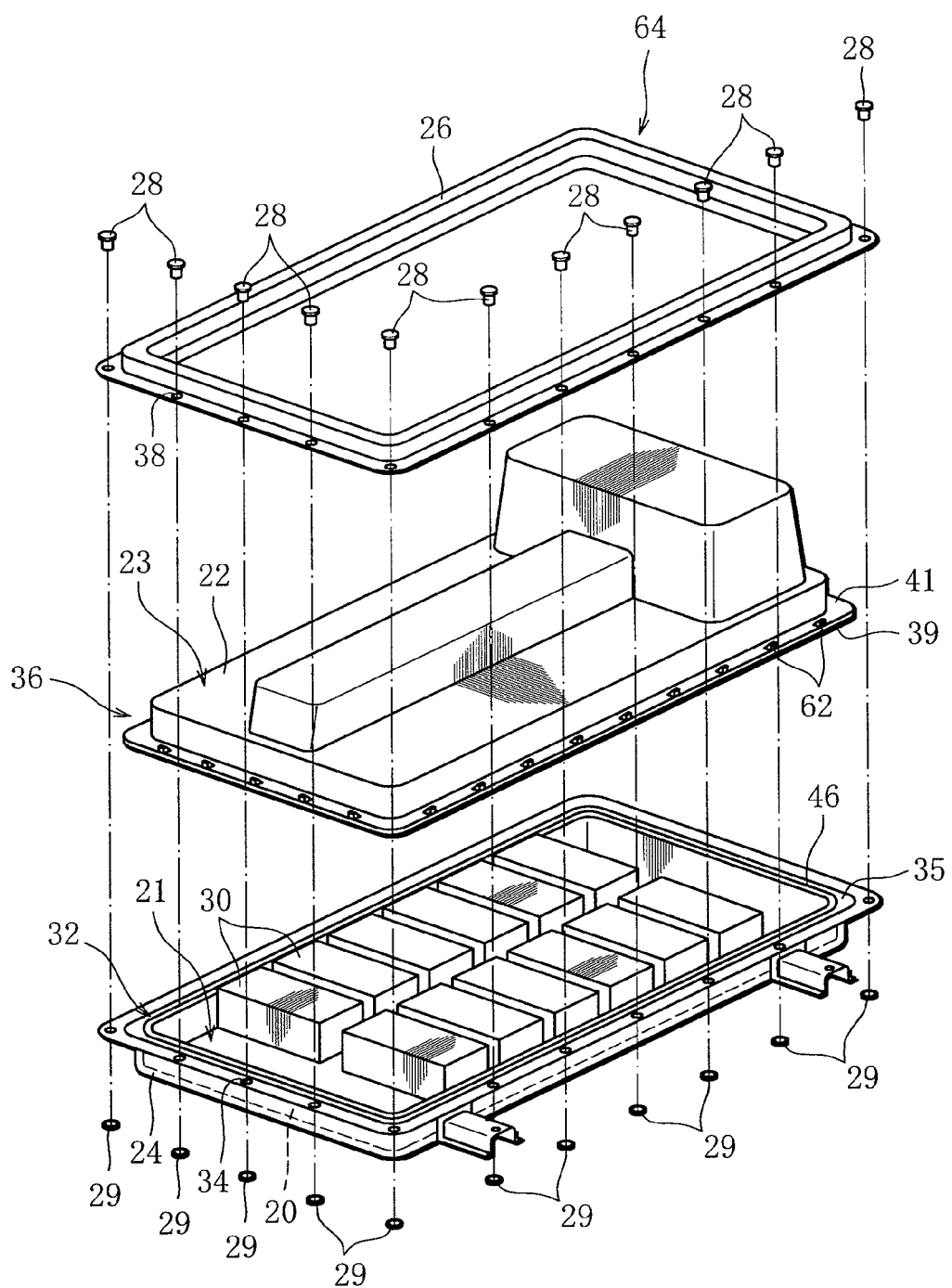
FIG. 3 is an exploded perspective view of a first embodiment of the battery case according to the present invention.

Specifically, as seen in FIG. 3, which is an exploded perspective view of the battery case 10, a plurality of battery modules 30 are arranged in a holder portion 21 of the resin tray 20. The first metal plate 24 is arranged to contact the periphery of the resin tray 20 with its outer circumferential edge portion projecting outward from the tray flange 32 by a predetermined length. The first metal plate 24 has through-holes 34 arranged at predetermined intervals, the through-holes 34 being at predetermined locations outwardly away from the tray flange 32.

The resin tray 20 has a contact surface 35 intended to meet a contact surface 39 of the cover 22. The resin tray 20 as well as the cover 22 is molded from an electrically-insulating resin.

The cover 22 includes a cover portion 23 designed to cover the battery modules 30, and a cover flange 36 intended to overlie the tray flange 32. The second metal plate 26 is arranged to contact the cover flange 36 with its outer circumferential edge portion projecting outward from the cover flange 36 by a predetermined length. The second metal plate 26 has through-holes 38 at locations predetermined to correspond to the through-holes 34 in the first metal plate 24, and thus, outwardly away from the cover flange 36.

Figure 4:
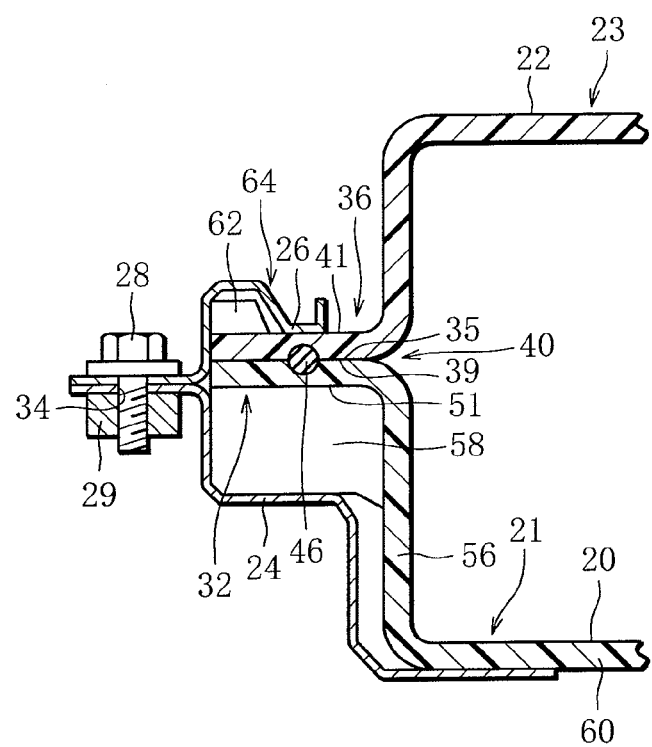
FIG. 4 is an enlarged cross-sectional view along line A-A in FIG. 2.

As seen in FIG. 4, which is a cross-sectional view along line A-A indicated in FIG. 2, the resin tray 20 has ribs 58 on the rear surface 51 of the tray flange, or surface opposite to the contact surface 35, the ribs each extending from the edge of the tray flange up to the outer wall 56 of the holder portion, thus connecting the tray flange 32 and the holder portion 21. The first metal plate 24 is arranged to contact the bottoms of the ribs 58, and its inner circumferential edge portion extends in contact with the bottom 60 of the resin tray 20.

The cover 22 has projections 62 on the rear surface 41 of the cover flange, or surface opposite to the contact surface 39, at the edge thereof. The second metal plate 26 includes a bent portion 64 designed to cover the projections 62, then contact the rear surface of the cover flange 36, and then extend in a direction away from the cover flange 36. The second metal plate 26 is thus arranged with its inner circumferential edge portion contacting the rear surface 41 of the cover flange 36 and extending in a direction away from it.

At the joint 40 at which the tray flange 32 and the cover flange 36 meet is arranged a waterproof seal member 46. Specifically, the seal member 46 is arranged at a predetermined location at the joint at which the tray flange 32 and the cover flange 36 held between the first and second holding members 24, 26 meet. The seal member 46 is a resin-based seal member, for example, but may be another type as long as it can provide required waterproof performance The first and second metal plates 24, 26 are fastened together by inserting bolts 28 in the respective pairs of through-holes 34, 38 and tightening them into corresponding nuts 29, to hold the tray flange 32 and the cover flange 26 between them.

Figure 5:
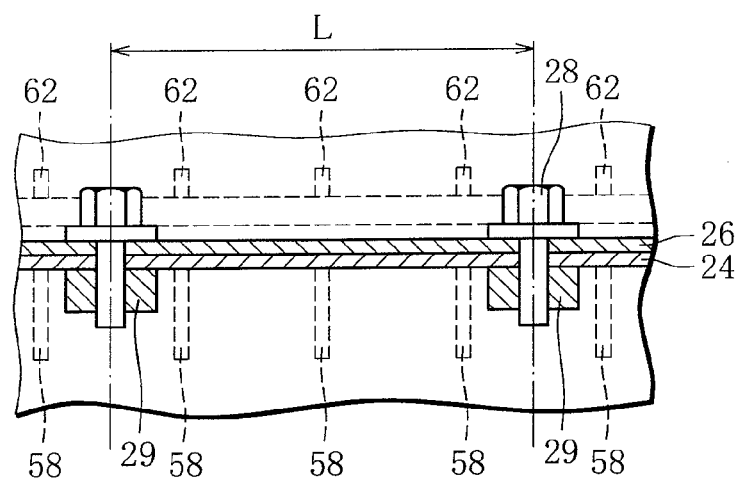
FIG. 5 is an enlarged cross-sectional view along line B-B in FIG. 2.

As seen in FIG. 5, which is a cross-sectional view along line B-B indicated in FIG. 2, the projections 62 are provided on the rear surface 41 of the cover flange 36 at predetermined intervals, while the ribs 58 are provided on the rear surface 51 of the tray flange 32 at predetermined intervals. Such first and second metal plates 24, 26 are fastened together by the bolts 28 and nuts 29, at predetermined intervals L to hold the tray flange 32 and the cover flange 36 between them.

As described above, the electric-vehicle battery case according to the present invention includes a first metal plate 24 arranged to cover the periphery of the resin tray 20 and a second metal plate 26 arranged to overlie the rear surface 41 of the cover flange 36. The first and second metal plates 24, 26 each have an outer circumferential edge portion designed to project outward from the flanges 32 of the resin tray 20 and the cover 22 by a predetermined length. The first metal plate 24 has through-holes 34 at the locations predetermined to be outwardly away from the tray flange 32, and the second metal plate 26 has through-holes 38 at the locations predetermined to correspond to the through-holes 34. Bolts 28 are inserted in the respective pairs of the through-holes 34, 38 and tightened into the corresponding nuts 29. As a result, the first and second metal plates 24, 26 are fastened together so that the tray flange 32 and the cover flange 36 are held between the first and second metal plates 24, 26.

In this structure, the first and second metal plates 24, 26 exert forces pushing on the tray flange 32 and the cover flange 36 toward the joint 40 at which the tray flange 32 and the cover flange 36 meet, thereby holding them in position. This prevents the tray flange 32 and the cover flange 36 from deforming due to temperature variation in the environment in which the battery case 10 is placed, leading to improved sealing performance of the battery case 10.

The first and second metal plates 24, 26 each have an outer circumferential edge portion projecting outward from the tray flange 32 of the resin tray 20 and the cover flange 36 of the cover 22 by a predetermined length, which allows the first and second metal plates 24, 26 to be fastened together by bolts 28 and nuts 29 at the predetermined locations outwardly away from the tray flange 32 and the cover flange 36.

Thus, neither the resin tray 20 nor the cover 22, each being made of a resin, does not extend between the outer circumferential edge portions at which the first and second metal plates 24, 26 are fastened together by the bolts 28 and nuts 29. The first and second metal plates 24, 26 fastened together this way exhibit high rigidity, which allows the bolts 28 and nuts 29 to be arranged at increased intervals L, leading to a reduction in costs and an increase in productivity.

Further, the first and second metal plates 24, 26 are fastened together by the bolts 28 and nuts 29; weld nuts are not used. Such bolts and nuts can be tightened by stably applying torque, which widens the allowable range of torque applied for tightening and facilitates the torque management, leading to an increase in productivity.

Further, the bent portion 64 of the second metal plate 26 is designed to contact the cover flange and then extend in a direction away from the cover flange. The second metal plate is fastened with such bent portion 64 being elastically deformed to push on the cover flange 36. This leads to improved sealing performance of the battery case 10.

The cover 22 has projections 62 arranged on the rear surface 41 of the cover flange opposite to the contact surface 39, at predetermined intervals, and the projections 62 are covered by the bent portion 64 of the second metal plate 26.

Thus, if a force pulling on the second metal plate 26 outward is applied, displacement of the second metal plate is hindered by the bent portion 64 colliding against the projections 62. The projections 62 thus function to resist such force. This prevents the second metal plate 26 and the first metal plate 24 fastened thereto from coming off the flange 32, leading to improved sealing performance of the battery case 10.

The resin tray 20 has ribs 58 arranged on the rear surface 51 of the tray flange surface opposite to the contact surface 35, at predetermined intervals, the ribs 58 each extending from the edge of the tray flange up to the outer wall 56 of the holder portion, thus connecting the tray flange 32 and the holder portion 21. Such ribs 32 increase the rigidity of the resin tray 20, and thus, increase the strength of the battery case 10.

Further, a seal member 46 is arranged at the joint 40 at which the tray flange 34 and the cover flange 36 held between the first and second metal plates 24, 26 meet.

In other words, the seal member 46 is arranged at a predetermined location within a region in which the first and second metal plates 24, 26 exert forces pushing on the tray flange and the cover flange towards the joint 40. The seal member 46 thus arranged can effectively seal the joint 40, leading to improved sealing performance of the battery case 10.

Second Embodiment

Referring to the drawings attached, a second embodiment of the present invention will be described below. The second embodiment differs from the first embodiment in that it is designed to ensure sufficient sealing performance of the battery case 10 even when the flanges of the resin tray 20 and the cover 22 constituting the battery case 10 deform; in the other respects, the two embodiments are similar. Thus, the difference will be explained in detail, while the description of the features common to both embodiments will be omitted.

Figure 6:
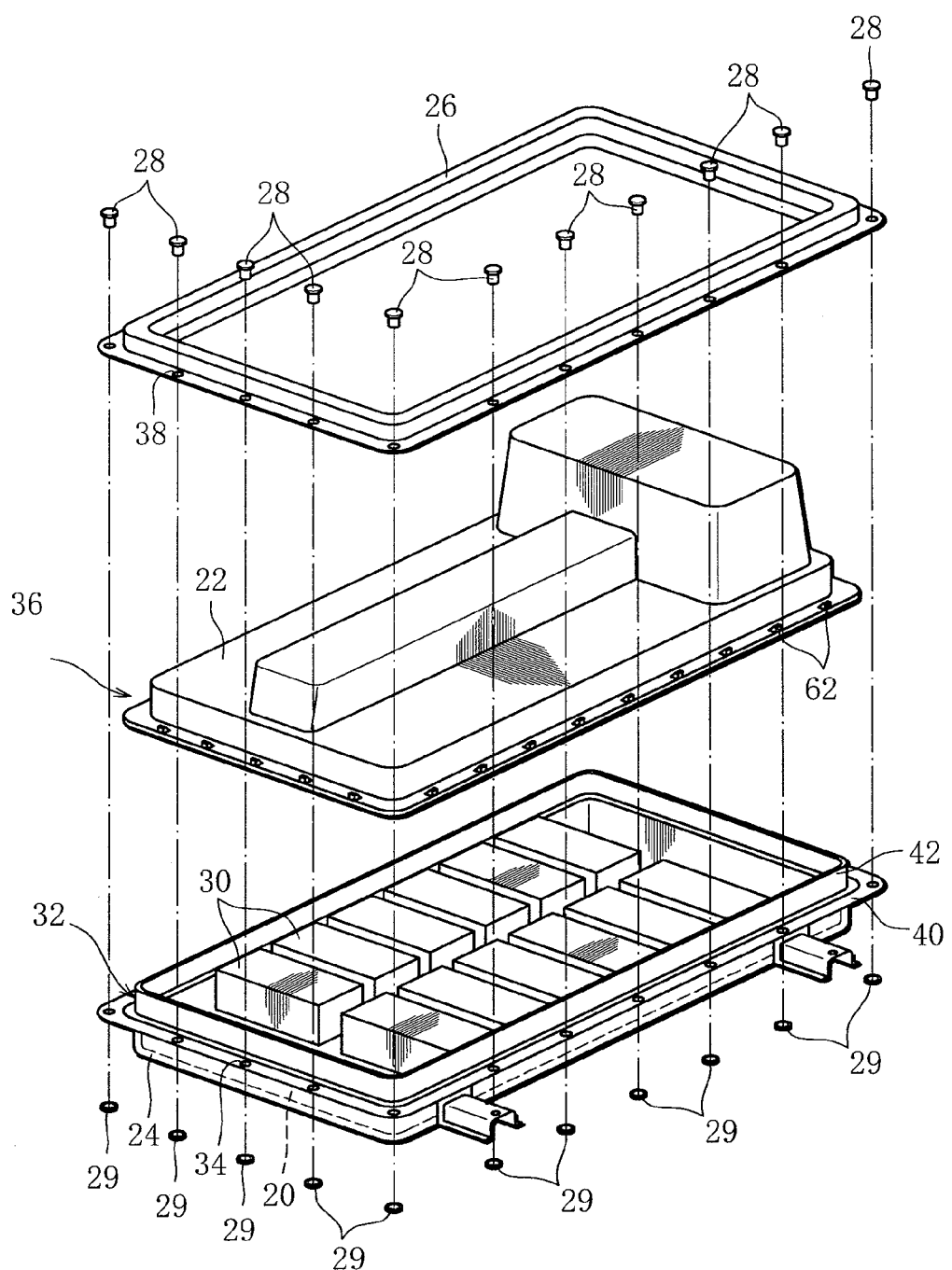
FIG. 6 is an exploded perspective view of a second embodiment of the battery case according to the present invention.

FIG. 6 is an exploded perspective view of the second embodiment of the automotive battery case 10 according to the present invention.

The resin tray flange 32 has a projecting portion 42 on the surface which is to meet the cover flange 36 to form a joint 40, the projecting portion 42 extending continuously along the circumference.

Figure 7:
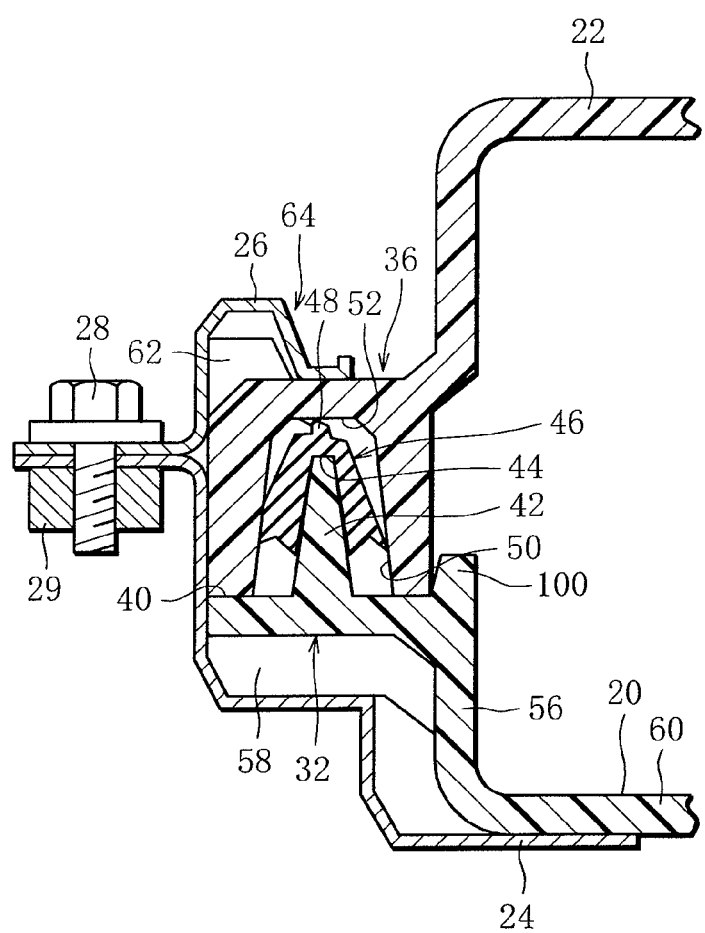
FIG. 7 is an enlarged cross-sectional view of the second embodiment of the present invention along line A-A indicated in FIG. 2.

Specifically, as seen in FIG. 7, which is an enlarged cross-sectional view along line A-A, the projecting portion 42 of the resin tray flange 32 has a vertical cross-section gradually widening from the top 44 toward the bottom, where "vertical" means the direction at right angles to the direction in which the projecting portion 42 continuously extends.

A continuous seal member (elastic member) 46 is fitted over the projecting portion 42. The seal member 46 fitted over the projecting portion 42 shows a cross-section approximately in the shape of an inverted V, and thus, gradually widening toward the bottom of the projecting portion 42. The seal member 46 is an elastic rubber member, for example, but may be another type as long as it can provide required sealing performance.

The seal member 46 has a lip (projection) 48 at the top, or surface opposite to the inner surface that contacts the top 44 of the projecting portion 42.

The cover flange 36 with a great thickness compared with the tray flange 32 has a groove 50 designed to receive the projecting portion 42. The groove 50 has horizontal cross-sectional area gradually increasing from the bottom (inner surface) 52 toward the open end, where "horizontal" means the direction in which the projecting portion 42 fitted therein continuously extends. In other words, the groove has a vertical cross-section gradually widening from the bottom toward the open end.

The projecting portion 42 is fitted in the groove 50 with the seal member 46 being pressed against the inner surface of the groove 50, thus each groove-facing side surface of the seal member contacting the corresponding inner side surface (inner surface) 54 of the groove, and the lip 48 contacting the inner bottom surface 52.

The resin tray flange 32 with the projecting portion 42 has a restricting portion 100 provided to prevent the groove 50 from widening due to the pressure P exerted by the projecting portion 42 with the seal member 45 attached, thus maintaining the shape of the groove 50, when the projecting portion 42 is inserted into the groove 50.

Between the first and second metal plates 24, 26, the pressure P exerted through the wedge effect of the projecting portion 42 with the seal member 46 attached improves the sealing performance. The restricting portion 100 may be an annular portion continuously extending along the circumference, or may be a series of projections arranged along the circumference at predetermined intervals if needed.

As described above, in the present embodiment, the tray flange 32 has a projecting portion 42 having a vertical cross-section gradually widening from the top 44 toward the bottom, where "vertical" means the direction at right angles to the direction in which the projecting portion 42 continuously extends. A continuous seal member 46 having a cross-section approximately in the shape of an inverted V, and thus, gradually widening in the direction toward the bottom of the projecting portion 42, is fitted over the projecting portion 42. The cover flange 36 with a great thickness compared with the tray flange 32 has a groove 50 extending continuously along the circumference, into which the projecting portion 42 with the seal member 46 fitted on is fitted. As described with regard to the first embodiment, the first metal plate 24 is arranged to cover the periphery of the resin tray 20, and the second metal plate 26 is arranged to overlie the rear surface of the cover flange 36. The first and second metal plates 24, 26 each have an outer circumferential edge portion projecting outward from the flanges 32, 36 by a predetermined length and having through-holes 34, 38. By inserting bolts 28 in the respective pairs of through-holes 34, 38 and tightening them into the corresponding nuts 29, the first and second metal plates 24, 26 are fastened together with the tray flange 32 and the cover flange 36 held between.

The first and second metal plates 24, 26 fastened together by the bolts 28 and nuts 29 push on the cover flange 36 and the tray flange 32 toward each other so that the seal member 46 fitted over the projecting portion 42 is pressed into the groove 50.

By virtue of its shape widening toward the bottom, the pressed-in seal member 46 contacts the inner side surfaces 54 of the groove 50 with an increased area of contact, which means that the seal member 46 receives a compressing force vertically acting on an increased area of contact, and thus, an increased compressing force, leading to improved sealing performance, and thus, improved waterproof performance.

Even when the fastening force exerted by the bolt 28 tightened in the nut 29 in its axial direction varies from bolt 28 to bolt 28, the seal member 46 is pressed into the groove 50 as a result of the cover flange 36 and the tray flange 32 being pushed on toward each other. Consequently, the seal member 46 receives from each inner side surface 54 of the groove 50 a compressing force vertically acting on the corresponding contacting surface. The compressing force acting vertically on the contacting surface does not significantly vary from place to place, leading to stable sealing performance and increased reliability.

Further, the fact that the compressing force acting vertically on the contacting surface of the seal member 46 pushed in the groove 50 does not significantly vary from place to place facilitates the management of torque to be applied to tighten the bolts 28, leading to an increase in productivity.

Further, the seal member 46 approximately in the shape of an inverted V provides increased ease of fitting over the projecting portion 42, leading to an increase in productivity.

Further the seal member 46 which is an elastic rubber member satisfactorily seals the boundary with the groove 50, leading to improved sealing performance, and thus, improved waterproof performance.

The seal member 46 has a lip 48 at the top, or surface opposite to the inner surface that contacts the top 44 of the projecting portion 42, and the seal member is fitted in the groove 50 with the lip 48 in contact with the inner bottom surface 52 of the groove 50. This means that the seal member 46 contacts the groove 50 with an increased number of surfaces, and thus, an increased area of contact, and thus, undergoes an increased compressing force vertically acting on the contacting surface, leading to improved sealing performance, and thus, improved waterproof performance.

The first and second metal plates 24, 26 are fastened together with the periphery of the resin tray 20 and the cover flange 36 held between. The first and second metal plates 24, 26 thus push on the tray flange 32 and the cover flange 36 toward each other so that the seal member 46 is pressed against the inner side surfaces 54 of the groove 50. As a result, the seal member 46 receives from each inner side surface 54 of the groove 50 an increased compressing force acting vertically on the corresponding contacting surface, leading to improved sealing performance, and thus, improved waterproof performance.

Third Embodiment

Next, a third embodiment of the present invention will be described.

The third embodiment of the automotive battery case differs from the second embodiment in that the cover flange 36 has a projecting portion 42 and the tray flange 32 with a great thickness compared with the cover flange 36 that has a groove 50; in the other respects, the two embodiments are similar. Thus, the difference will be explained, while the description of the features common to both embodiments will be omitted.

Figure 8:
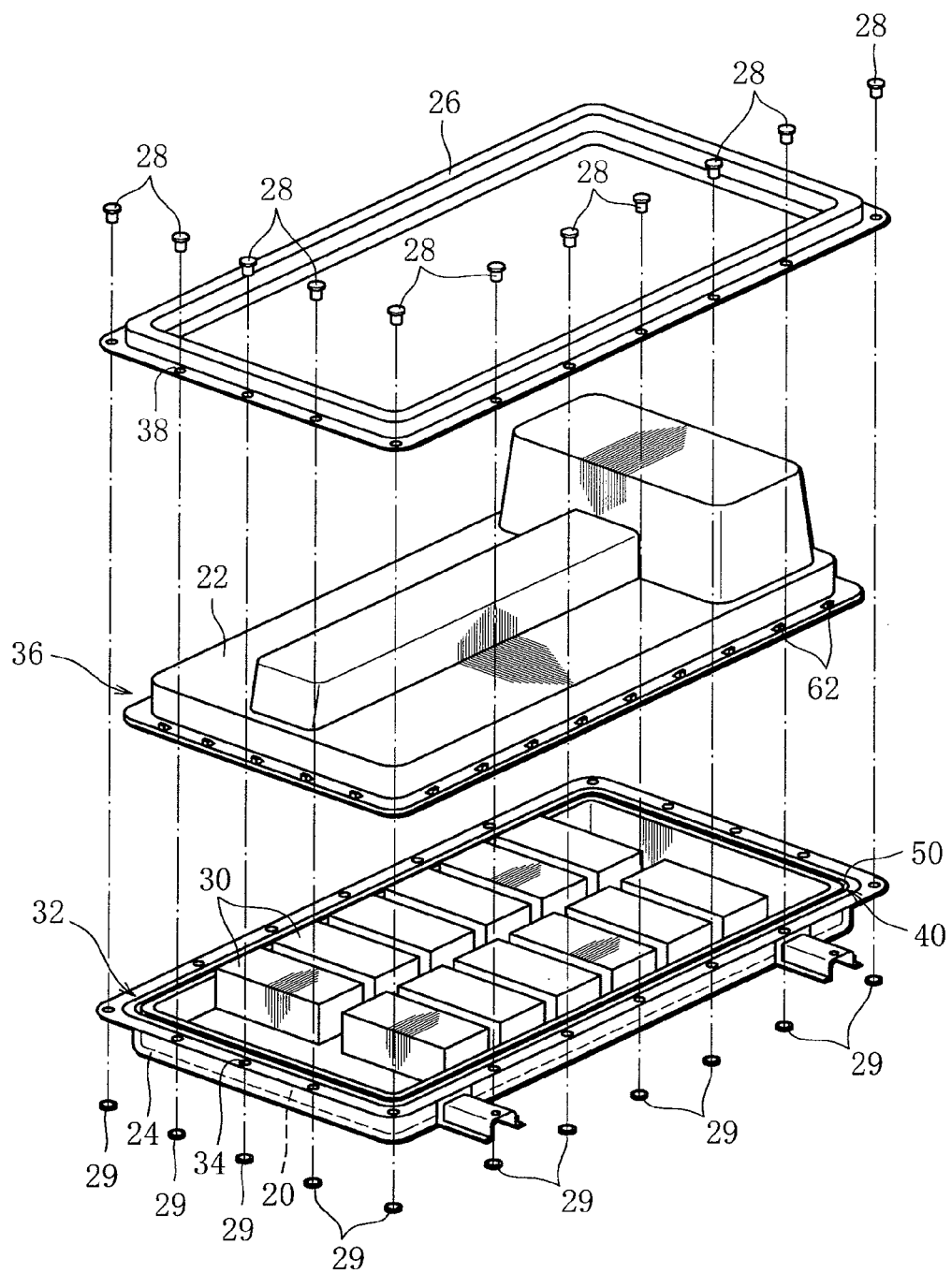
FIG. 8 is an exploded perspective view of a third embodiment of the battery case according to the present invention.

FIG. 8 is an exploded perspective view of the third embodiment of the automotive battery case according to the present invention.

As seen in FIG. 8, the tray flange 32 has a groove 50.

Figure 9:
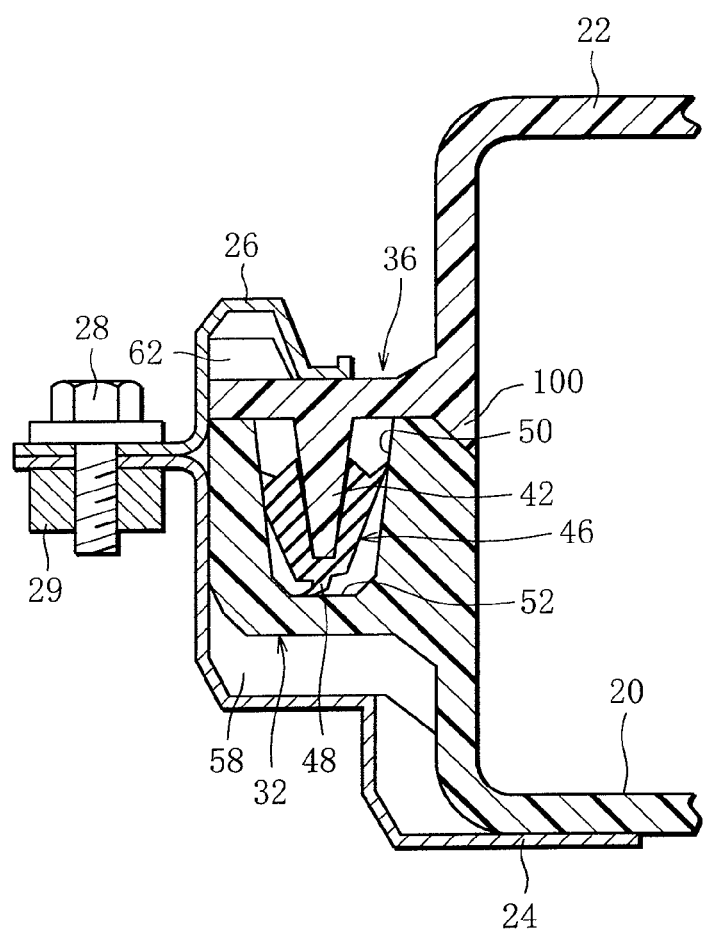
FIG. 9 is an enlarged cross-sectional view of the third embodiment of the present invention along line A-A indicated in FIG. 2.

Specifically, as seen in FIG. 9, which is an enlarged cross-sectional view along line A-A indicated in FIG. 2, the tray flange 32 with a great thickness compared with the cover flange 36 has a groove 50 having horizontal cross-sectional area increasing from the bottom 52 toward the open end, where "horizontal" means the direction in which the projecting portion 42 received in the groove 50 continuously extends. The projecting portion 42 of the cover flange 36 with an approximately V-shaped seal member 46 fitted on is fitted in the groove 50.

The cover flange 36 with the projecting portion 42 has a restricting portion 100 provided to prevent the groove 50 from widening due to the pressure P exerted by the projecting portion 42 with the seal member 46 attached, thus maintaining the shape of the groove 50, when the projecting portion 42 is inserted into the groove 50.

The first metal plate 24 is arranged to cover the periphery of the resin tray 20, and the second metal plate 26 is arranged to contact the cover flange 36. The first and second metal plates 24, 26 are fastened together by bolts 28 and nuts 29 at locations a predetermined distance outwardly away from the tray flange 32 and the cover flange 36.

As described above, in the present embodiment, the projecting portion 42 of the cover flange 36 with the seal member 46 fitted on is fitted in the groove 50 of the tray flange 32, and the first metal plate 24 arranged to contact the periphery of the resin tray 20 and the second metal plate 26 arranged to contact the cover flange 36 are fastened together by bolts 28 and nuts 29 at locations a predetermined distance outwardly away from the tray flange 32 and the cover flange 36.

In this structure, as a result of the bolts 28 and nuts 29 exerting fastening forces in their axial direction, the cover flange 36 and the tray flange 32 are pushed on toward each other so that the seal member 46 fitted over the projecting portion 42 of the cover flange 36 is pressed into the groove 50, producing the same effects as described with regard to the first embodiment.

The approximately V-shaped seal member 46 provides increased ease of fitting over the projecting portion 42, leading to an increase in productivity.

Fourth Embodiment

Next, a fourth embodiment of the present invention will be described.

The fourth embodiment of the automotive battery case differs from the second embodiment in that the groove has opposite sides extending at right angles to the bottom; in the other respects, the two embodiments are similar. Thus, the difference will be explained, while the description of the features common to both embodiments will be omitted.

Figure 10:
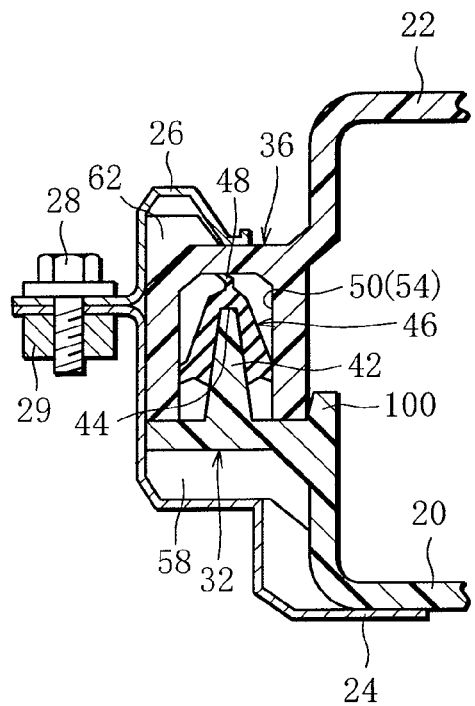
FIG. 10 is an enlarged cross-sectional view of a fourth embodiment of the present invention along line A-A indicated in FIG. 2.

FIG. 10 is an enlarged cross-sectional view of the fourth embodiment of the present invention along line A-A indicated in FIG. 2.

As seen in FIG. 10, the groove 50 provided in the cover flange 36 has opposite sides extending at right angles to the bottom, and the seal member 46 is fitted in the groove 50.

Figure 11:
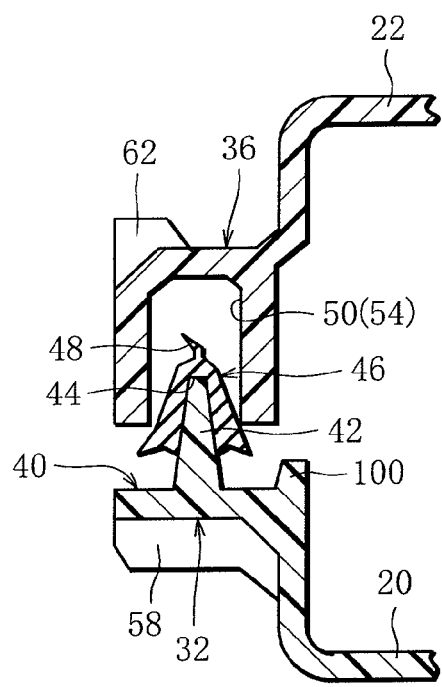
FIG. 11 is an exploded view of the part shown in FIG. 10.

As seen in FIG. 11, which is an exploded view of the part shown in FIG. 10, the seal member 46 fitted over the projecting portion 42 shows a vertical cross-section gradually widening from the top 44 toward the bottom of the projecting portion 42, and an end-to-end width greater than the width of the groove 50.

In this structure, as a result of the bolts 28 and nuts 29 exerting fastening forces in their axial direction, the cover flange 36 and the tray flange 32 are pushed on toward each other so that the seal member 46 fitted over the projecting portion 42 of the tray flange 36 is pressed into the groove 50, producing the same effects as described with regard to the first embodiment.

Fifth Embodiment

Next, a fifth embodiment of the present invention will be described.

The fifth embodiment of the automotive battery case differs from the second embodiment in that the groove has opposite sides extending at right angles to the bottom 52 approximately up to the middle, and then slanting to go away from each other, thus providing width gradually increasing toward the joint 40 at which the cover flange and the tray flange meet; in the other respects, the two embodiments are similar. Thus, the difference will be explained, while the description of the features common to both embodiments will be omitted.

Figure 12:
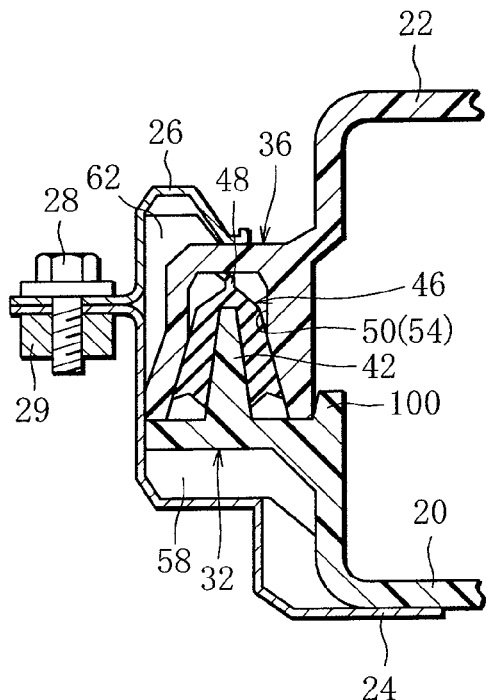
FIG. 12 is an enlarged cross-sectional view of a fifth embodiment of the present invention along line A-A indicated in FIG. 2.

FIG. 12 is an enlarged cross-sectional view of the fifth embodiment of the present invention along line A-A indicated in FIG. 2.

As seen in FIG. 12, the groove 50 provided in the cover flange 36 has opposite sides extending at right angles to the bottom 52 approximately up to the middle, and then slanting to go away from each other, thus providing width gradually increasing toward the joint 40 at which the cover flange and the tray flange meet.

Figure 13:
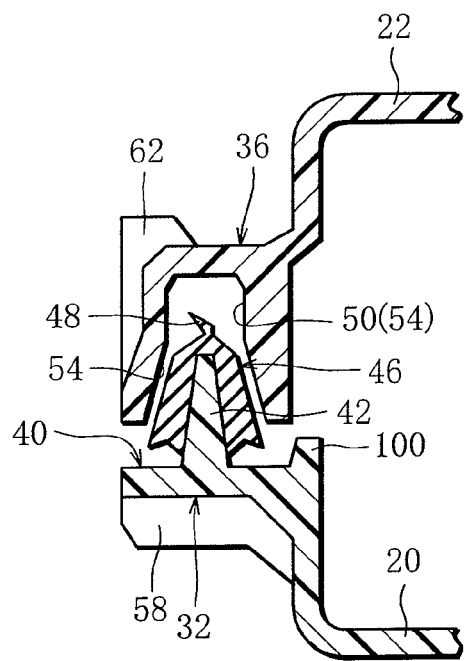
FIG. 13 is an exploded view of the part shown in FIG. 12.

As seen in FIG. 13, which is an exploded view of the part shown in FIG. 12, the width of the groove 50 approximately at the middle thereof is smaller than the width that the seal member 46 fitted over the projecting portion 42 has.

In this structure, as a result of the bolts 28 and nuts 29 exerting fastening forces in their axial direction, the cover flange 36 and the tray flange 32 are pushed on toward each other so that the seal member 46 fitted over the projecting portion 42 of the tray flange 36 is pressed into the groove 50. By virtue of the groove 50's shape gradually widening toward the open end, the seal member 46 contacts the inner side surfaces 54 with an increased area of contact, thus producing the same effects as described with regard to the first embodiment.

Sixth Embodiment

Next, a sixth embodiment of the present invention will be described.

The sixth embodiment of the automotive battery case differs from the fifth embodiment in that the seal member 46 has a lateral projection on each side surface to face the corresponding side surface 54 defining the groove 50 gradually widening toward the open end; in the other respects, the two embodiments are similar. Thus, the difference will be explained, while the description of the features common to both embodiments will be omitted.

Figure 14:
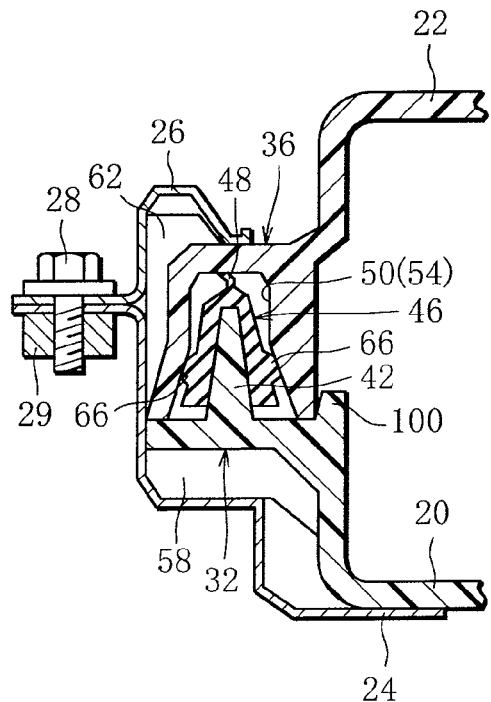
FIG. 14 is an enlarged cross-sectional view of a sixth embodiment of the present invention along line A-A indicated in FIG. 2.

FIG. 14 is an enlarged cross-sectional view of the sixth embodiment of the present invention along line A-A indicated in FIG. 2.

As seen in FIG. 14, the seal member 46 has a lateral projection 66 on each side surface to face the corresponding side surface 54 defining the groove 50 gradually widening toward the open end.

Figure 15:
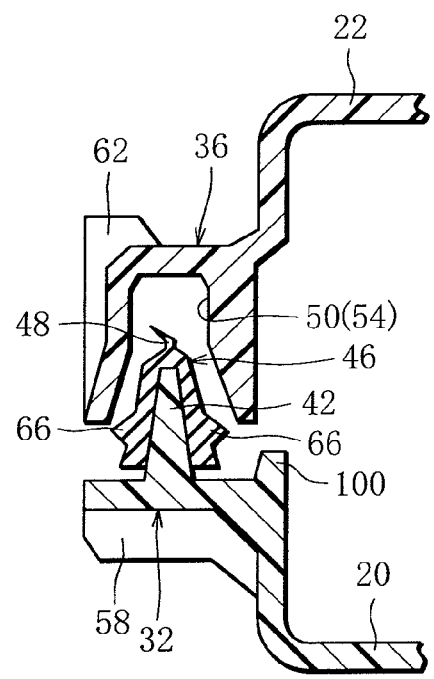
FIG. 15 is an exploded view of the part shown in FIG. 14.

As seen in FIG. 15, which is an exploded view of the part shown in FIG. 14, the width between the tops of the lateral projections 66, 66 of the seal member 46 is greater than the width of the groove 50 at the location at which the lateral projections 66, 66 are to contact the groove 50 gradually widening toward the open end.

In this structure, as a result of the bolts 28 and nuts 29 exerting fastening forces in their axial direction, the cover flange 36 and the tray flange 32 are pushed on toward each other so that the seal member 46 fitted over the projecting portion 42 of the tray flange 32 is pressed into the groove 50, where the lateral projection 66 on each side surface of the seal member 46 contacts and is pushed on by the corresponding inner surface 54 of the groove 50, thus producing the same effects as described with regard to the fourth embodiment.

Seventh Embodiment

Next, a seventh embodiment of the present invention will be described.

The seventh embodiment of the automotive battery case differs from the fifth embodiment in that the seal member 46 has approximately uniform width although it shows a vertical cross-section approximately in the shape of an inverted V when fitted over the projecting portion 42, where "vertical" means the direction at right angles to the direction in which the projecting portion 42 continuously extends; in the other respects, the two embodiments are similar. Thus, the difference will be explained, while the description of the features common to both embodiments will be omitted.

Figure 16:
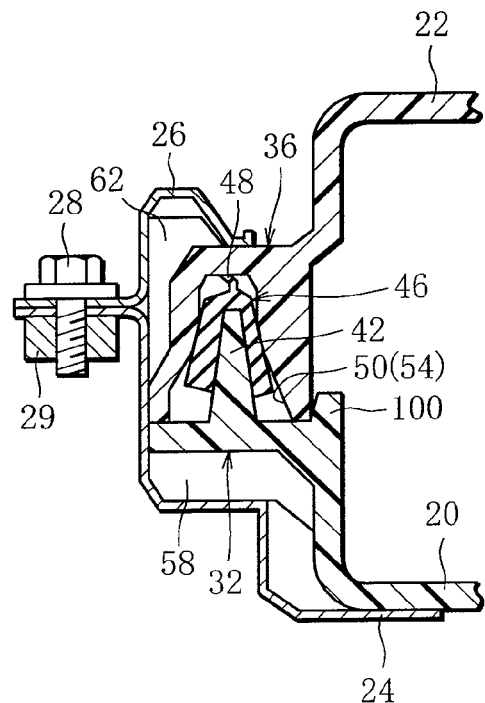
FIG. 16 is an enlarged cross-sectional view of a seventh embodiment of the present invention along line A-A indicated in FIG. 2.

FIG. 16 is an enlarged cross-sectional view of the seventh embodiment of the present invention along line A-A indicated in FIG. 2.

As seen in FIG. 16, the seal member 46 fitted over the projecting portion 42 shows a vertical cross-section approximately in the shape of an inverted V.

Figure 17:
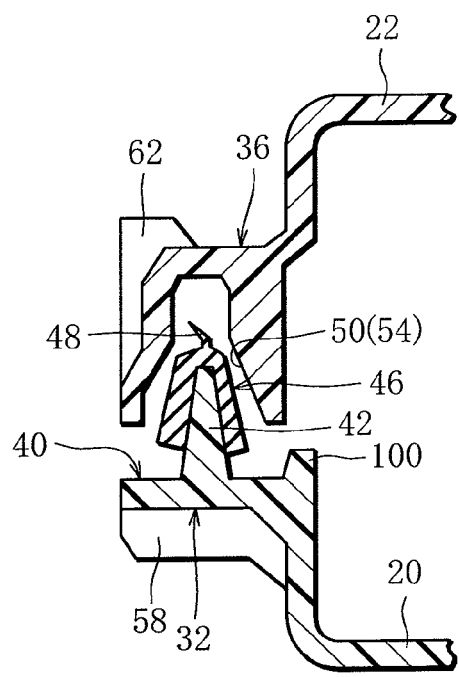
FIG. 17 is an exploded view of the part shown in FIG. 16.

As seen in FIG. 17, which is an exploded view of the part shown in FIG. 16, the width of the groove 50 approximately at the middle thereof is smaller than the width which the seal member 46 fitted over the projecting portion 42 has.

In this structure, as a result of the bolts 28 and nuts 29 exerting fastening forces in their axial direction, the cover flange 36 and the tray flange 32 are pushed on toward each other so that the seal member 46 fitted over the projecting portion 42 of the tray flange 36 is pressed into the groove 50 and contact the inner side surfaces 54 of the groove with an increase area of contact, thus producing the same effects as described with regard to the fourth embodiment.

Eighth Embodiment

Next, an eighth embodiment of the present invention will be described.

The eighth embodiment of the automotive battery case differs from the fourth embodiment in that the groove 50 has a through-hole at the bottom, the through-hole being closed with a sealing plug; in the other respects, the two embodiments are similar. Thus, the difference will be explained, while the description of the features common to both embodiments will be omitted.

Figure 18:
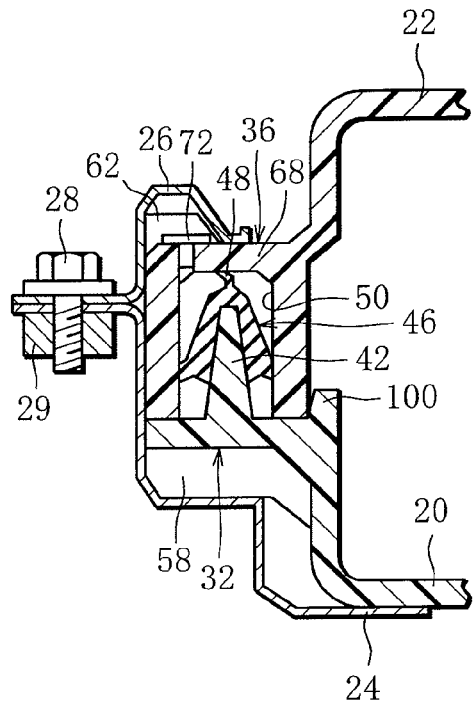
FIG. 18 is an enlarged cross-sectional view of an eighth embodiment of the present invention along line A-A indicated in FIG. 2.

FIG. 18 is an enlarged cross-sectional view of the eighth embodiment of the present invention along line A-A indicated in FIG. 2.

As seen in FIG. 18, the groove 50 has a through-hole (air vent) 70 at the bottom 68, which is closed with a sealing plug 72 so that the bottom 68 forms a continuous extension.

Figure 19:
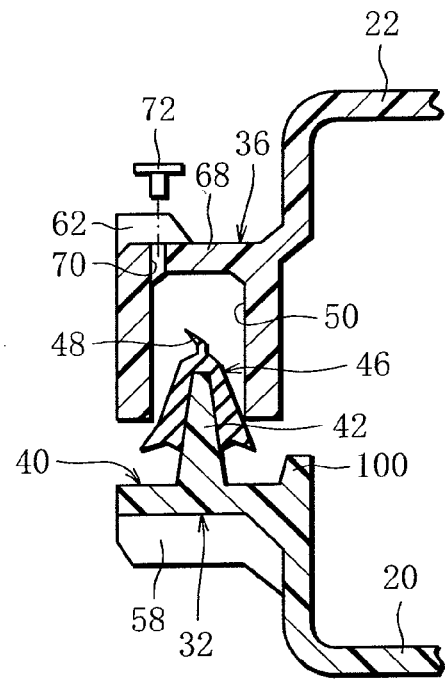
FIG. 19 is an exploded view of the part shown in FIG. 18.

As seen in FIG. 19, which is an exploded view of the part shown in FIG. 18, the through-hole 70 functions as an air vent to allow air to flow out of the groove 50.

This ensures that, when the projecting portion 42 with the seal member 46 fitted on is fitted in the groove 50, the seal member 46 contacting the groove 50 does not form a closed space between its groove-facing surface and the bottom 68 of the groove. Thus, if pushing in the seal member 46 causes a pressure increase between the groove-facing surface of the seal member 46 and the bottom 68, the pressure decreases by air flowing out through the through-hole 70. This prevents the fitting of the seal member 46 from becoming difficult due to the pressure, or rather provides enhanced ease of fitting, leading to an increase in productivity.

With the through-hole 70 closed with the sealing plug 72, the bottom 68 forms a continuous extension, and thus, the groove 50 is sealed, leading to improved sealing performance, and thus, improved waterproof performance.

This embodiment also has the same effects as described with regard to the fourth embodiment.

In the above, several embodiments have been described. The present invention is however not limited to the described embodiments.

For example, in the described embodiments, the first metal plate 24 has an inner circumferential edge portion extending on the outer bottom surface 60 of the resin tray 20, while the second metal plate 26 has an inner circumferential edge portion extending on the rear surface 41 of the cover 22. The first metal plate 24 may however be altered to cover the entire outer surface of the resin tray 20, and the second metal plate 26 may be altered to cover the entire outer surface of the cover 22.

In the described embodiments, the second metal plate 26 includes a bent portion 64, which covers the projections 62 on the rear surface 41 of the cover 22 opposite to the contact surface 39, thereby preventing the first and second metal plates 24, 26 from coming off the tray flange 32 and the cover flange 36. This may be altered such that the resin tray 20 includes coming-off preventing projections while the first metal plate 24 includes a bent portion.

In the described embodiments, the resin tray 20 has ribs 28 on the rear surface 51 to increase rigidity. The means for ensuring that the battery box 10 has sufficient rigidity is however not limited to this.

In the second to eighth embodiments, the projecting portion 42 has a vertical cross-section gradually widening from the top 44 toward the bottom, where "vertical" means the direction in which the projecting portion 42 continuously extends. It may however be arranged such that the projecting portion 42 has uniform width from the top 44 up to the bottom and the elastic member 46 fitted over such projecting portion 42 has a vertical cross-section gradually widening from the top 44 toward the bottom of the projecting portion 42.

In the second to eighth embodiments, the seal member 46 has a lip 48. Instead, the groove 50 may have a projection to contact the seal member 46.

The embodiments have been described taking as an example the case in which they are installed on an electric vehicle. They are however applicable to hybrid vehicles.

EXPLANATION OF REFERENCE NUMERALS

1: Electric vehicle
10: Battery case
20: Resin tray (tray member)
22: Cover (cover member)
24: First metal plate (first holding member)
26: Second metal plate (second holding member)
28: Bolt (fastening means)
29: Nut (fastening means)
32: Tray flange
36: Cover flange
42: Projecting portion
46: Seal member (elastic member)
48: Lip (projection)
50: Groove
58: Rib
62: Projection
64: Bent portion
66: Lateral projection (projection)
70: Through-hole (air vent)
72: Sealing plug
100: Restricting portion

The invention claimed is:

1. An automotive battery case for holding a battery for driving a vehicle, comprising:

a tray member of a resin, including a holder portion for holding the battery and a tray flange projecting outward from the holder portion, a cover member of a resin, including a cover portion designed to cover the battery and a cover flange projecting outward from the cover portion, the tray member and the cover member being arranged with the cover flange and the tray flange placed one on the other, a first holding member of a metal arranged to contact the tray flange from an outside of the tray flange with an outer circumferential edge portion projecting outward from the tray flange by a predetermined length, a second holding member of a metal arranged to contact the cover flange from an outside of the cover flange with an outer circumferential edge portion projecting outward from the cover flange by a predetermined length, and a fastening means fastening the first and second holding members, between which the tray and cover flanges are held together, at a predetermined location outwardly away from the tray and cover flanges.

2. The automotive battery case according to claim 1, wherein at least either one of the first and the second holding member includes a bent portion contacting the corresponding tray or cover flange and then extending in a direction away from said tray or cover flange.

3. The automotive battery case according to claim 1, further comprising:
one or more projections arranged on at least either one of the tray flange and the cover flange,
said one or more projections being covered by said bent portion.

4. The automotive battery case according to claim 1, further comprising:
ribs arranged on the tray flange along its circumference at predetermined intervals, the ribs each extending to connect the tray flange and the holder portion.

5. The automotive battery case according to claim 1, further comprising:
a seal member for sealing a joint at which the tray flange and the cover flange meet,
said seal member being arranged at the joint at which the tray flange and the cover flange held between the first and the second holding members meet.

6. The automotive battery case according to claim 1, further comprising:
a groove provided in either one of the tray flange and the cover flange to extend continuously along its circumference,
a projecting portion provided on the other of the tray flange and the cover flange to extend continuously along its circumference, and fitted in said groove, and
an elastic member arranged between the projecting portion and the groove, wherein
at least either one of the projecting portion and the elastic member has a vertical cross-section gradually widening in the direction from a top toward a bottom of the projecting portion to make a surface of the elastic member which faces the groove contact an inner surface of the groove, where "vertical" means the direction at right angles to the direction in which the projecting portion continuously extends.

7. The automotive battery case according to claim 6, wherein the elastic member has a vertical cross-section approximately in the shape of a V or an inverted V designed to allow the elastic member to be fitted over the projecting portion, where "vertical" means the direction at right angles to the direction in which the projecting portion continuously extends.

8. The automotive battery case according to claim 6, wherein the elastic member is an elastic rubber member.

9. The automotive battery case according to claim 6, wherein the groove has horizontal cross-sectional area increasing to a bottom toward an open end, where "horizontal" means the direction in which the projecting portion fitted in the groove continuously extends.

10. The automotive battery case according to claim 6, wherein
the groove has
an air vent extending through the bottom of the groove, and
a sealing plug fitted in to close the air vent after the elastic member is arranged in the groove.

11. The automotive battery case according to claim 6, wherein at least either one of the elastic member and an inner surface of the groove has one or more projections so that the elastic member and the inner surface of the groove contact each other at said one or more projections.

12. The automotive battery case according to claim 6, further comprising:
a restricting portion preventing the groove from widening due to the projecting portion fitted in the groove.

* * * * *